United States Patent [19]

Kagebeck

[11] Patent Number: 5,419,744

[45] Date of Patent: May 30, 1995

[54] JOINING DEVICE

[75] Inventor: Tor Kagebeck, Linköping, Sweden

[73] Assignee: ICL Systems AB, Kista, Sweden

[21] Appl. No.: 295,700

[22] Filed: Aug. 25, 1994

[30] Foreign Application Priority Data

Feb. 28, 1992 [SE] Sweden ................. 9200605

[51] Int. Cl.6 ................................ F16G 7/00
[52] U.S. Cl. ................... 474/253; 474/255
[58] Field of Search ................. 474/253-258

[56] References Cited

U.S. PATENT DOCUMENTS

| 4,254,666 | 3/1981 | Seredick | 474/253 |
| 4,437,849 | 3/1984 | Berg | 474/256 |
| 4,445,877 | 5/1984 | Love et al. | 474/255 |
| 5,160,300 | 11/1992 | Moore et al. | 474/257 |
| 5,338,265 | 8/1994 | Kilgar | 474/256 |

Primary Examiner—Michael Powell Buiz
Attorney, Agent, or Firm—Lee, Mann, Smith, McWilliams, Sweeney & Ohlson

[57] ABSTRACT

The invention relates to a device for joining together toothed belt elements (16, 20). The device includes two flat parts (12, 24) which are mutually joined through the medium of a hinge-forming web-part (26). At least one flat part (24) has engagement elements (30, 32) for engagement with corresponding recesses in the belt elements (16, 20), and snap-in locking means (36, 38, 40, 42) are provided for locking the flat parts (12, 24) together.

8 Claims, 1 Drawing Sheet

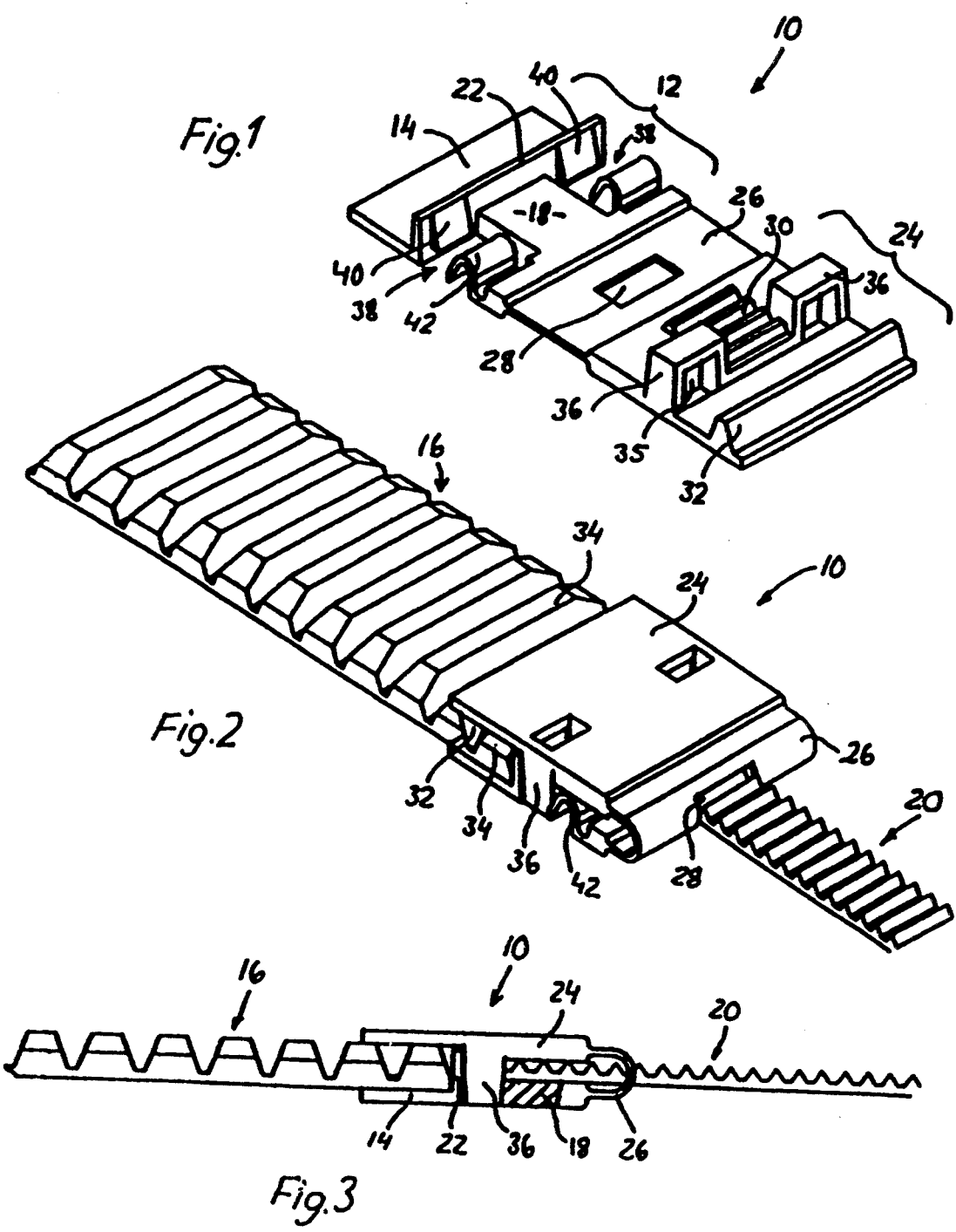

JOINING DEVICE

The present invention relates to a device which is intended for joining together belt elements, preferably toothed belt elements and which comprises a first flat part having a surface for abutment with one side of an end-part of a first belt element and a surface for abutment with the one side of an end-part of a second belt element, and further comprises a second flat part having a surface for abutment with the other side of the end-part of the first belt element and a surface for abutment with the other side of the end-part of the second belt element.

Toothed belt elements have previously been joined together with the aid of butt-straps or plates of particular configuration which are overlapped on mutually adjacent end-parts of the toothed belts and the ends of the toothed belts securely clamped between the straps or plates and fixed with the aid of screws. According to another method, the ends of the belts are glued together, one end of the belt being placed in a recess in the other end of the belt. These belt joining methods are work-demanding and time-consuming and therewith expensive.

An object of the present invention is to provide a belt-joining device which will enable two toothed belt elements to be joined together quickly and simply without the use of additional fastener means.

This object is achieved with a belt-joining device of the aforedescribed kind which is characterized in that the two flat parts are mutually joined by a hinge which permits one flat part to be folded over the other; in that in each case one of these belt abutment surfaces of the flat parts which oppose one another subsequent to folding said flat parts presents at least one outwardly projecting engagement element whose cross-section corresponds generally to the cross-section of a recess in respective ends of the belt elements; and in that the two flat parts are provided with coacting snap-lock means which function to mutually lock said flat parts and hold the end-parts of the belt elements firmly clamped between the flat parts with the engagement elements inserted in respective recesses. This construction of an inventive belt-joining device enables the belt ends to be readily placed on one flat part and the other flat part then folded over the belt ends with respective engagement elements moved into engagement with associated recesses in the belt ends, said snap-lock means being caused to mutually lock the flat parts with the belt ends clamped therebetween, without the need of additional fastener means, such as screws, glue, etc. The flat parts can be folded either along a line which extends in the length direction of the belt elements or along a line which extends transversely to said length direction.

In the case of one suitable embodiment of the invention, the hinge has the form of a thinned web-part between the flat parts, wherein when folding is to be effected along a line which extends transversely to the length direction of the belt elements, a throughlet opening is provided for the insertion of one belt element in said web-part.

One flat part is preferably provided with a transverse abutment element whose one side forms an abutment for the end-edge of one belt element while the other side forms an abutment for the end-edge of the other belt element.

The belt element engagement means preferably has the form of rack teeth and, when the belt elements have mutually different widths, have a length which corresponds to the length of respective teeth on the belt elements.

The snap-lock means may have any desired appropriate form. In the case of one preferred embodiment, the snap-lock means may have the form of two projections formed on one of the flat parts, these projections being intended for insertion into corresponding recesses in the other flat part, wherein outwardly projecting members on one side of the abutment elements are intended to snap into corresponding apertures in the projections.

The inventive belt-joining device is advantageously produced from plastic material in a single-piece structure.

The invention will now be described in more detail with reference to the accompanying drawing, in which FIG. 1 is a perspective view of an inventive belt-joining device and shows the device prior to being fitted;

FIG. 2 illustrates the belt-joining device when fitted in a position of use, in which two toothed belt elements of mutually different widths are held together; and FIG. 3 is a side view of the belt-joining device when fitted.

As will be seen from FIG. 1, the belt-joining device, generally referenced 10, comprises a first flat part 12 which has a support surface 14 for supporting one side of the end-part of a first belt element 16, which in the example illustrated in FIG. 2 is comprised of a toothed jalousie-like belt which is intended to cover a gap intended for the read head of a printer unit. The flat part 12 also has a support surface 18 for supporting one side of the end-part of a second belt element 20, which in the FIG. 2 illustration is comprised of a toothed belt which is intended to drive a read head slide (not shown) to the printer unit and which is to be joined to the jalousie-belt 16. The end-edges of the belt element 16, 20 are intended to abut a respective side surface of an abutment element 22 which extends transversely across the flat part 12.

The belt-joining device 10 also includes a second flat part 24 which is joined to the first flat part 12 through the medium of a thinned web-part 26. The web-part 26 is provided with a throughlet opening 28 for the narrower toothed belt 20. The flat part 24 has a plurality of engagement elements in the form of gripping ridges 30 whose cross-sections and lengths correspond to the cross-sections and lengths of the tooth interspaces on the toothed belt 20. The flat part 24 also includes a transverse gripping bar 32 which is intended to be inserted in shape-conforming engagement in a space between two rib elements 34 on the first belt element 16 when the second flat part 24 is folded around the web-part 26 and over the first flat part 12 subsequent to having first inserted the toothed belt 20 through the opening 28 and into abutment with the abutment element 22 and subsequent to having placed the jalousie belt 16 on the support surface 14.

For the purpose of holding the flat parts 12 and 24 in mutually fixed relationship while clamping the ends of the belts 16, 20 firmly therebetween, with the gripping ridges and bar 30, 32 in engagement with respective rib interspaces and tooth interspaces, the flat parts 12, 24 are provided with mutually coacting snap-lock members. As shown in FIG. 1, these members may comprise projections 36 provided with apertures 35 and fitted to the flat part 24, and two recesses 38 which are complementary to the projections 36 and included in the flat part 12, wherein a wedge-shaped outwardly projecting member 40 on one side wall of the abutment element 32 is intended to snap into the aperture 35 of respective projections 36. Located on the respective sides of the recesses 38 opposite the wedge-shaped member 40 is a spring tongue 42 which functions to hold the projection 36 in engagement with said wedge-shaped projection 40.

The inventive belt-joining device is conveniently injection moulded in the form of a single-piece structure from plastic material, for instance from a polyamide plastic.

It will be understood that the invention is not restricted to the illustrated exemplifying embodiment thereof and that changes can be made within the scope of the following Claims. For instance, an embodiment is conceivable in which the flat parts are folded over one another through the agency of a web-part which lies on one side of the belt elements, i.e. an embodiment in which the flat parts are folded along a line which extends parallel with the length directions of the belts. In this case, the throughlet opening for insertion of the toothed belt 20 is not required. Furthermore, the gripping ridges and bar 30, 32 may alternatively be located on the support surfaces 14, 18 or on both of the flat parts 12, 24 when the toothed belt has teeth on both sides thereof.

I claim:

1. A device for joining together first and second belt elements, preferably toothed belt elements, comprising a first flat part having a surface for abutment with one side of one end-part of the first belt element and having a surface for abutment with one side of one end-part of the second belt element, and further comprising a second flat part having a surface for abutment with the other side of the end-part of the first belt element and a surface for abutment with the other side of the end-part of the second belt element, characterized in that the two flat parts are preferably mutually connected by a hinge such as to allow one said flat part to be folded over the other said flat part; in that in each case subsequent to folding said flat parts one of the opposing belt abutment surfaces of said flat parts will present at least one outwardly projecting engagement element whose cross-selectional shape corresponds generally to the cross-selectional shape corresponds generally to the cross-sectional shape of a recess in the end of respective belt elements; and in that the two flat parts are provided with coacting snap-lock means for mutually locking the flat parts and holding the end-parts of the belt elements firmly clamped between said flat parts with the engagement elements inserted in respective recesses.

2. A device according to claim 1, characterized in that the hinge has the form of a thinned web-part between the flat parts.

3. A device according to claim 2, characterized in that the web-part includes a belt element throughlet opening.

4. A device according to claim 1, characterized in that an abutment element extends transversely across one flat part, wherein one side of the abutment element forms an abutment surface for the end-edge of one belt element whereas the other side of said abutment element forms an abutment surface for the end-edge of the other belt element.

5. A device according to claim 1, characterized in that the engagement elements for the belt elements have the form of rack teeth.

6. A device according to claim 1, characterized in that the engagement elements have mutually different lengths.

7. A device according to claim 4, characterized in that the snap-lock means have the form of two projections which are formed on one flat part and which are intended to be inserted in corresponding recesses in the other flat part, wherein outwardly projecting members on one side of the abutment element are intended to snap into corresponding apertures in the projections.

8. A device according to claim 1, characterized in that the device is a one-piece structure preferably made of plastic material.

* * * * *